Jan. 10, 1967  G. S. WADE  3,296,756
PRE-FABRICATED DWELLING UNIT
Filed Aug. 24, 1964  7 Sheets-Sheet 1

FIG. I.

INVENTOR.
GLENN S. WADE
BY
ATTORNEYS

Jan. 10, 1967       G. S. WADE       3,296,756
PRE-FABRICATED DWELLING UNIT
Filed Aug. 24, 1964       7 Sheets-Sheet 3

INVENTOR.
GLENN S. WADE
BY
ATTORNEYS

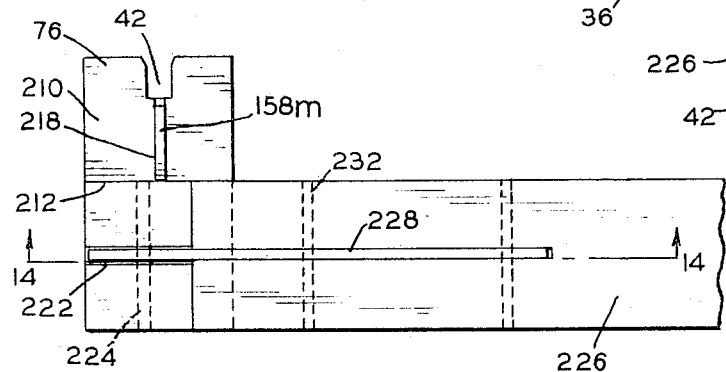
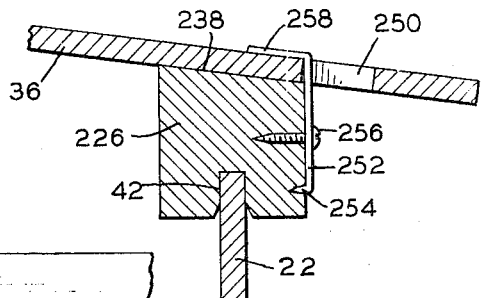
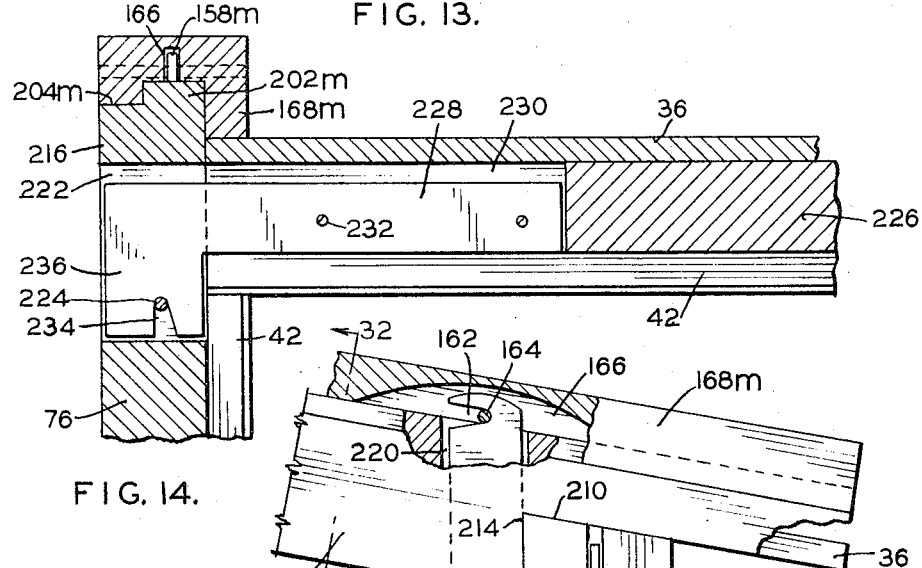
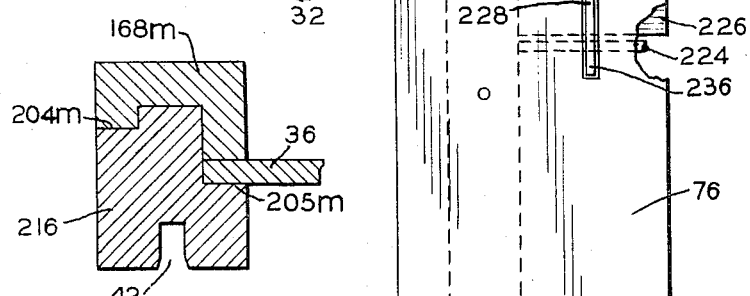
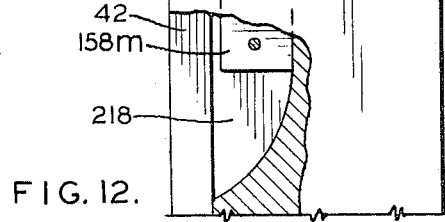

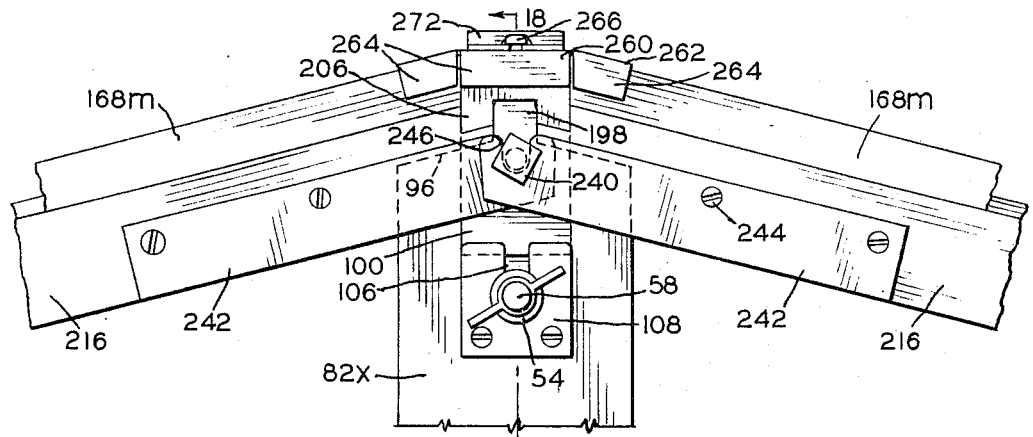
FIG. 16.
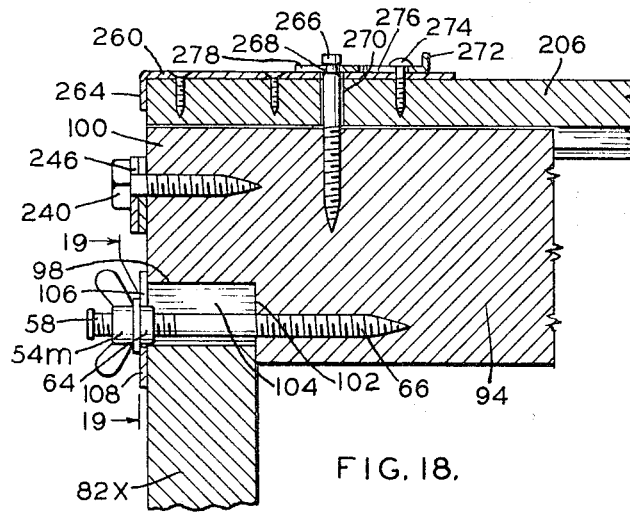
FIG. 18.
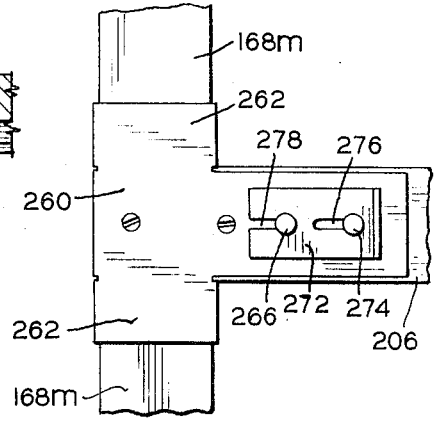
FIG. 17.
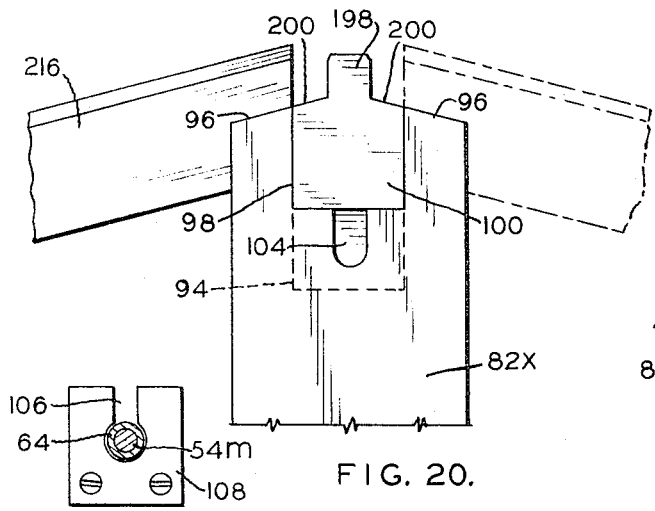
FIG. 19.
FIG. 20.
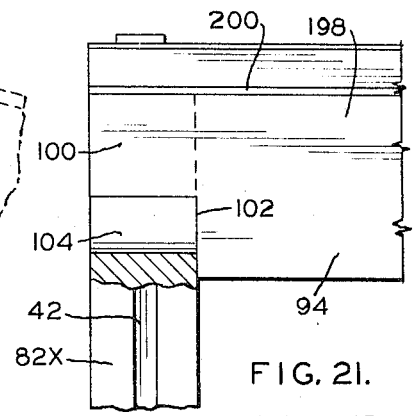
FIG. 21.
INVENTOR.
GLENN S. WADE
BY
ATTORNEYS

United States Patent Office 3,296,756
Patented Jan. 10, 1967

3,296,756
PRE-FABRICATED DWELLING UNIT
Glenn S. Wade, 753 Steele, Denver, Colo. 80206
Filed Aug. 24, 1964. Ser. No. 391,431
19 Claims. (Cl. 52—93)

This invention relates to a pre-fabricated building structure and, more specifically, to a unit of the type aforementioned which can be disassembled at any time, moved to a different location and reassembled in a short time without the need of tools or other equipment.

Many situations exist where a warm, weatherproof semi-permanent dwelling is needed, yet, tents and mobile homes are unsatisfactory. For example, hunting in the high country during the fall and winter can become extremely uncomfortable and even dangerous if, perchance, a blizzard or heavy snowfall occurs. While few hunters would admit that a tent is not adequate under these conditions, the fact is that most of them would trade for a shelter offering better protection against the elements at any time the opportunity to do so was presented. Many a hunting trip has been cut short because of colds and frost-bitten feet suffered during long cold nights spent trying to keep warm on a soggy tent floor. The nature of this activity is such, however, that more adequate shelter is seldom available. House trailers, even the small ones, cannot traverse the rough terrain over which one must pass to get into good hunting country. To a lesser extent, the same is true of the popular "campers" carried on the bed of pick-up trucks as these vehicles are not designed for travel in wilderness areas.

The above is but one of many examples of situations wherein a semi-permanent dwelling could be used to advantage in place of tents and the like. Others would be temporary living quarters at remote sheep and cow camps, mining operations and construction sites inaccessible to ordinary means of transportation. Another extremely important need that would be answered by a prefabricated dwelling of the type disclosed herein is to provide low-cost housing for displaced persons and the underprivileged in all areas of the world. Considerable impetus has been given to housing for the distressed peoples of our society in recent years and, as yet, few, if any, dwellings have been designed that provide adequate shelter and do not also require many tools and considerable skill not usually found in primitive areas.

The above and other shortcomings of the prior art temporary pre-fabricated dwelling units have, in large measure, been overcome through the provision of a house that can be transported in a "knocked-down" condition over the ruggedest terrain and erected by one or two unskilled persons on a suitable site without the aid of tools in a matter of an hour or so. A one room house approximately sixteen feet square with four walls, a roof, floor, door and windows will, when disassembled, occupy a space 1 x 4 x 8 ft. and, as a result, can be hauled from place-to-place in a small two-wheeled trailer drawn by a four-wheel drive vehicle of the type designed for travel over steep mountainous terrain.

The largest single piece is a 4 x 8 ft. panel of plywood or similar sheet material. Many of the studs, rafters, panels and similar elements are interchangeable while those that are not can easily be identified due to a particular shape or length. All joints are of the interlocking type which, for the most part, employ pin-and-slot arrangements or a simple wing-nut fastener. In the case of the latter type joint, fastening the nuts "finger-tight" is adequate to hold the elements securely together in assembled relation. Also, all connectors, regardless of construction, remain permanently fastened to one or the other of the interlocking pieces so that there are no small loose parts to become lost or misplaced.

Erection of the structure can be handled by one man although it can be done more easily and faster by two. If desired, the unit is strong enough to be elevated above ground level on jacks or other supports placed at intervals around the base. This may be necessary to accommodate uneven terrain and the like.

Each element of the structure is fastened into place in a pre-determined order capable of considerable variation. Generally speaking, as each item is erected, the succeeding element locks the preceding one into the structure so that it cannot be removed without reversing the assembly procedure. In erecting a conventional dwelling, the entire frame including floor, joists stud walls and rafters are all completed before any covering is laid thereon with the possible exception of the subfloor. Here, however, this procedure is not followed as the panels that constitute the floor, walls and roof are placed in position at the same time as the framing which supports same thus providing the interlocking assembly that requires no nails, screws or other permanent fasteners.

When completed, the structure is rugged, serviceable and completely weatherproof even under extreme conditions. If used as a semi-permanent dwelling, it can be equipped to provide conventional sanitary facilities, cabinets, cooking facilities and a stove, much as any permanent home. On the other hand, when employed as a temporary camp to be used a week or two, it need only be equipped with the usual conveniences available to tent-dwellers such as a portable camp stove, sleeping bags, cots, a lantern and the like.

It is, therefore, the principal object of the present invention to provide a novel and improved pre-fabricated dwelling.

A second objective is the provision of a unit of the type aforementioned that requires no tools, nails, screws or other loose fasteners in its assembly.

Another object is to provide a portable house which, in "knocked-down" condition can easily be hauled from place to place in a small two-wheeled trailer.

Still another objective sought herein is the provision of a low cost weatherproof shelter that can be erected quickly by unskilled persons in a very short time, yet, which produces a serviceable and rugged dwelling that can be occupied over extended periods of time.

An additional object of the invention herein disclosed and claimed is to provide a one-room house of moderate size that can easily be transported to relatively inaccessible wilderness areas and erected in the field.

Further objectives are the provision of a one-room cabin that is inexpensive, versatile, lightweight, adaptable to varying conditions of use, easy to assemble and disassemble, and decorative in appearance.

Other objects will be in part apparent and in part pointed out specifically hereinafter in connection with the description of the drawings that follows, and in which:

FIGURE 12 is an enlarged framentary side elevation with portions broken away and shown in section revealing the connection between the corner studs, the rafters and roof;

FIGURE 13 is a top plan view of the corner of FIGURE 12 with the roof and rafter removed;

FIGURE 14 is a fragmentary section taken along line 14—14 of FIGURE 13;

FIGURE 15 is a fragmentary vertical section showing the connection between the side panels and roof panels;

FIGURE 16 is a fragmentary end elevation to an enlarged scale showing the connection between the ridge beam, rafters and center stud supporting the ridge beam;

FIGURE 17 is a fragmentary top plan view of the connection of FIGURE 16;

FIGURE 18 is a section taken along line 18—18 of FIGURE 16;

FIGURE 19 is a section taken along line 19—19 of FIGURE 18;

FIGURE 20 is an end elevation similar to FIGURE 16 except that the hardware and ridge beam have been removed to better reveal the interior construction;

FIGURE 21 is a fragmentary front elevation looking to the left in FIGURE 20;

Figure 1:
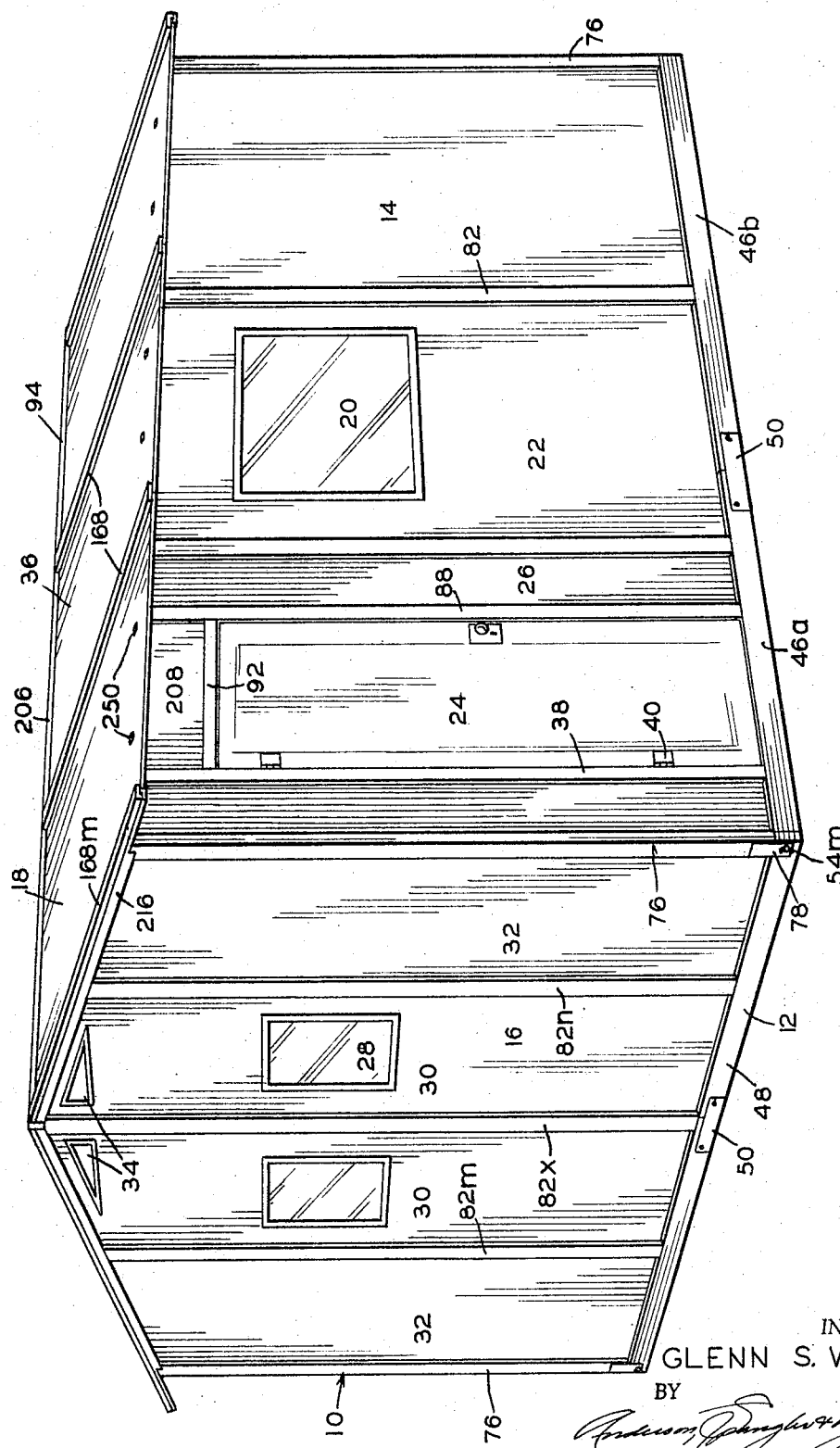
FIGURE 1 is a perspective view showing the front and one side of the dwelling unit of the present invention completely assembled.

Referring now to the drawings for a detailed description of the present invention and, initially, to FIGURE 1 for this purpose, the dwelling unit has been designated in its entirety by reference numeral 10 and will be seen to include a rectangular base or foundation 12 upon which rest upstanding front and rear walls 14 and right and left end walls 16. The top of the unit is covered by a gabled roof 18. No floor has been shown nor is one needed if the unit is used as a temporary shelter but, of course, one may be added if desired.

In the interest of simplicity and clarity of illustration, FIGURE 1 shows the dwelling somewhat smaller than it actually is, the usual unit employing four standard four foot wide plywood panels across the front and back and at both ends to provide a living area inside of about 250 square feet. As illustrated, the unit might well have three four foot panels front and back with four two foot panels on the ends giving outer dimensions of approximately 8 x 12 feet. The unit as illustrated employs all the functional and novel features of the larger unit and, it is to be understood that it can be made either larger or smaller without departing from the teaching of the present invention. By using standard-width plywood sheets, the cost of fabrication is reduced along with waste. As for height, it has been found that 6 ft. 6 inches is adequate at the eaves with about 7 ft. 6 inches at the center although, here again, these dimensions can vary considerably at the option of the user.

As shown, a window 20 has been included in the center panel 22 of the front wall and a door 24 in the left end panel 26 thereof. The rear wall which has not been shown would likely include the window but eliminate the door in favor of a plain panel. Similarly, the left end wall 16 has windows 28 in each of the inside panels 30 while both outside panels 32 are plain. Also, each of these inside end wall panels 30 has been shown provided with ventilators 34 located up near the roof. The right end wall is customarily constructed in the same way as the left end wall illustrated. All the roof panels 36 are identical and, in fact, interchangeable as are several other elements.

The door 24 and windows 20 and 28 can be permanently fastened to the panels of which they form a part or, preferably, are removable so that they can be carried separately and better protected against breakage. In the case of the door, however, it should in any case remain fastened to jamb element 38 by means of hinges 40 to simplify its installation and also to prevent loss of the hinge pins.

The various elements of the dwelling, particularly those exposed to the elements, should be pre-finished with weatherproof paint or the like. While the unit is designed for fabrication from wood because it is less expensive and easier to shape than other materials, the use of metal or plastic panels or metal-clad wood sheets is not precluded nor are extruded studs, rafters and similar elements. Be that as it may, the instant dwelling unit is the least expensive and simplest to manufacture from wood.

A relatively level flat site should be selected for placement of the unit and, as is oftentimes the case, preparing the site consumes more time and effort than actual erection of the structure. Minor variations in levelling can be taken care of by blocking up the low corners.

The first step in erecting the unit is to lay the base frame or foundation 12. This procedure together with connections made between the elements of the base frame can best be seen in FIGURES 1–9, inclusive, to which reference will now be made.

The basic elements of the base are 2 x 4's having a longitudinal groove 42 on their upper edges extending from end-to-end thereof. In the particular form shown, this groove 42 is flared slightly as revealed most clearly in FIGURE 9 to guide the tongue 44 of the studs and edges of the panels into place therein.

The front and rear base frame elements 46 are identical and interchangeable as are the side frame elements 48 although elements 46 and 48 differ slightly from one another at their extremities as will be explained presently. All of these elements, however, are made in two sections so as to reduce their over-all length.

The connector 50 shown in FIGURES 1, 7, 8 and 9 is used to detachably fasten the sections of each of the base frame elements together. This connector comprises an upwardly-opening elongate U-shaped channel adapted to receive the abutting ends of the base frame element sections that are to be joined together. A pin 52 permanently fastens the connector to one of the sections 46a while the other 46b has permanently attached thereto a bolt and wing-nut fastener 54 that is receivable in keyhole-shaped slot 56 in the connector end. The threaded end of the bolt 58 (FIGURE 8) is preferably upset to retain the wing nut so that the latter will remain a part of the fastener assembly at all times and not become lost.

Figure 7:
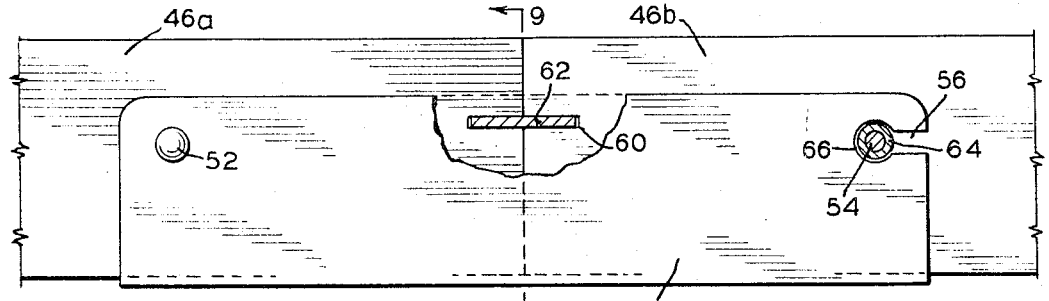
FIGURE 7 is an enlarged fragmentary elevation showing the assembly by which the two sections of floor joists are connected together in end-to-end abutting relation, portions of the connecting bracket having been broken away to better reveal the interior construction.

The abutting ends of the base frame element sections are provided with aligned slots 60 into which fit cross brace 62 that spans the connector legs in spaced parallel relation above the base thereof. The brace is located intermediate the ends of the connector so that approximately half of it lies within the aligned slots 60 of each section as shown in FIGURE 7. The connector itself, of course, projects well beyond the end of base frame element section 46a to receive the adjacent end of the other section 46b.

The wing nut includes an annular shoulder 64 sized to fit the circular enlargement 66 (FIGURE 7) of the keyhole-shaped slot 56 when tightened thus preventing separation of the base frame sections longitudinally, the width of slot 56 being such as to just pass the shank of the bolt.

Figure 2:
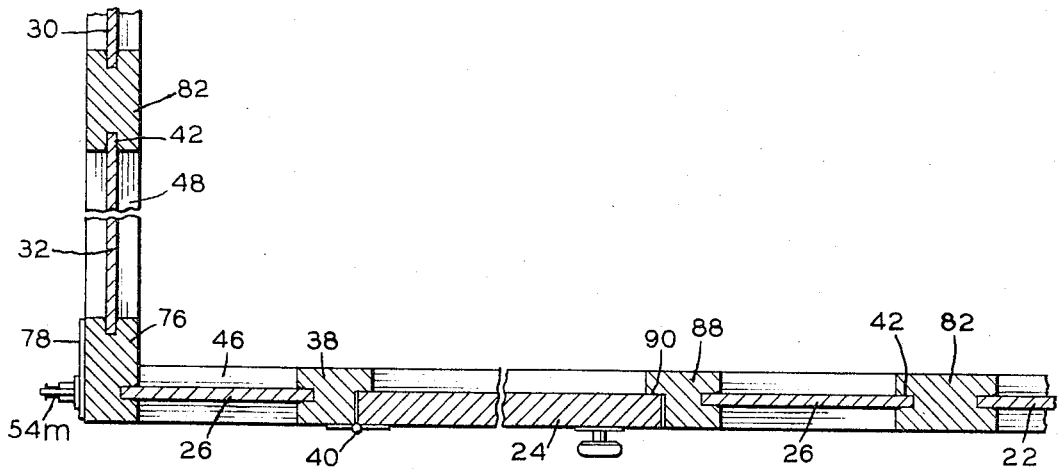
FIGURE 2 is a fragmentary horizontal section to an enlarged scale and with portions broken away to conserve space showing the front left corner construction.
Figure 3:
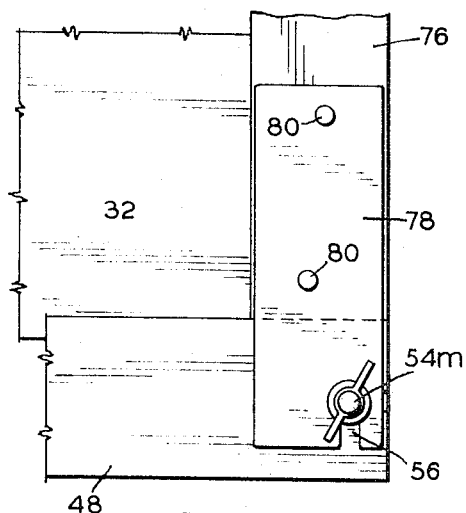
FIGURE 3 is an enlarged fragmentary side elevation showing the lower corner assembly.
Figure 4:
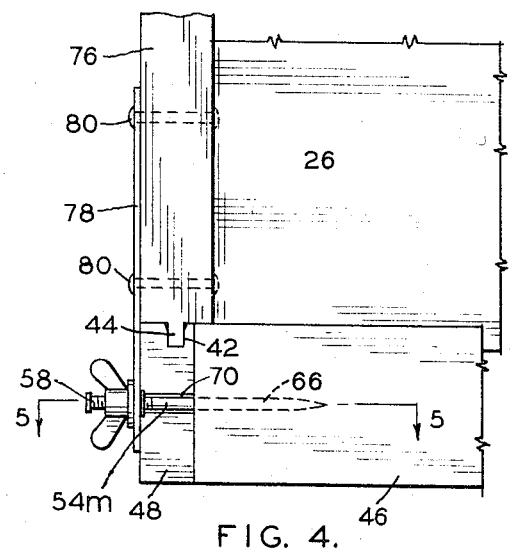
FIGURE 4 is a fragmentary front elevation of the lower corner assembly of FIGURE 3.
Figure 6:
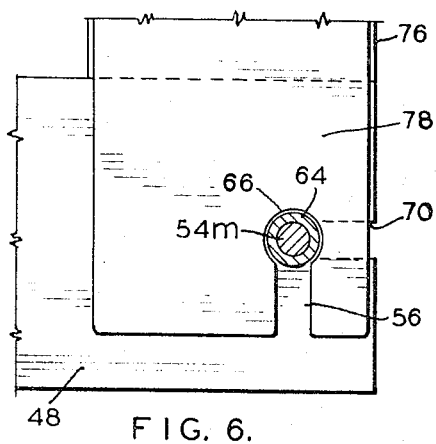
FIGURE 6 is a section taken along line 6—6 of FIGURE 5.
Figure 5:
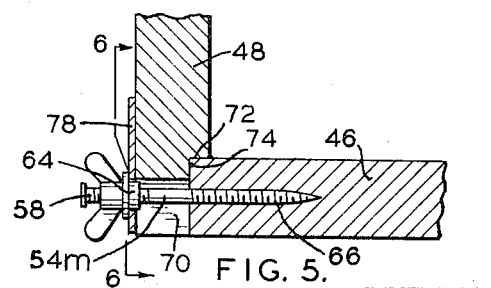
FIGURE 5 is a horizontal section taken along line 5—5 of FIGURE 4.
Figure 8:
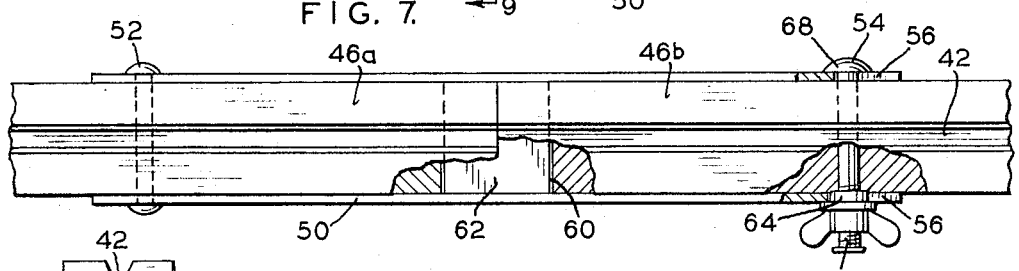
FIGURE 8 is a fragmentary top plan view of the joint of FIGURE 7, portions having been broken away to reveal the interior.
Figure 9:
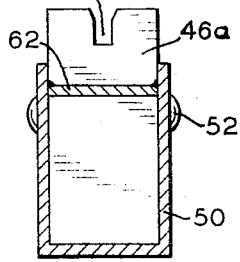
FIGURE 9 is a vertical section taken along line 9—9 of FIGURE 7.

The differences in base frame elements 46 and 48 are found in their remote ends which connect together to form the corners of the base as can best be seen in FIGURES 2-6, inclusive, to which reference will now be made. Both sections 46a and 46b of front and rear base frame elements 46 have slightly modified bolt and wing nut fastener assemblies 54m projecting longitudinally therefrom. The only difference between fastener assembly 54 of FIGURES 7 and 8 already described and the modified fastener assembly 54m of FIGURES 3, 4 and 5 is that the latter has the end 66 opposite the threaded end 58 on which the wing nut mounts provided with wood-screw threads for insertion into the blind end of the frame member in place of the standard bolt head 68 (FIGURE 8).

The remote extremities of the side frame elements 48 of the base are slotted as at 70 to receive the shank of the bolt that forms a part of the fastener assembly 54m. In addition, the inside corner 72 is mitered to receive the corresponding inside corner 74 of frame element 46 as seen in FIGURE 5.

Completion of the corner connections requires the addition of corner studs 76, but, as will be seen presently, these corner studs are not put in place until most of the remainder of the unit has been erected. Be that as it may, in the interests of continuity and clarity the description of the corner assembly will now be completed while reference is being made to FIGURES 2-6, inclusive.

On the lower end of each corner stud 76 is fastened a plate 78 by means of fasteners 80. This plate projects downwardly beyond the lower end of the stud and across the exposed face of side frame element 48 of the base where said plate is provided with a downwardly opening keyhole-shaped slot 56 identical to the correspondingly numbered slot in connector 50. The slot in plate 78 receives the shank of fastener 54m and the annular shoulder 64 of its wing nut locks into the circular enlargement 66 thereof. Thus, the wing nut bears against plate 78, locks the corner stud in place against vertical movement and draws the base frame element 46 into the mitered corner of element 48. The tongue of corner stud 44 fits into the corresponding groove of base element 48 as best seen in FIGURE 4.

Figure 11:
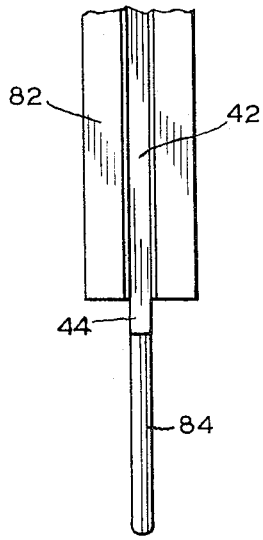
FIGURE 11 is a fragmentary edge view of the lower end of the stud.
Figure 10:
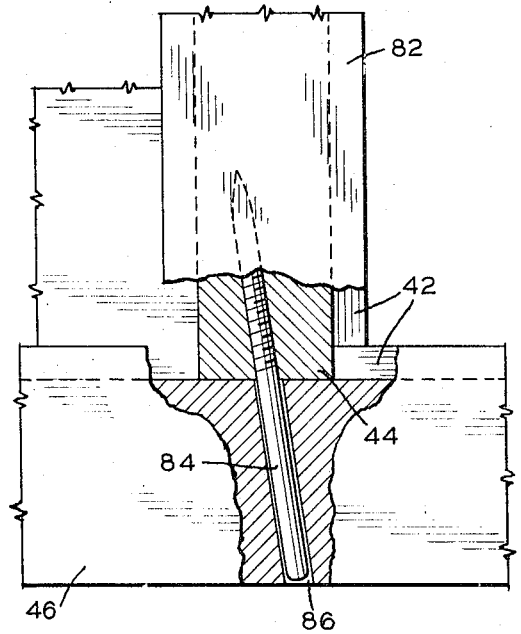
FIGURE 10 is an enlarged fragmentary elevation with portions broken away and shown in section that reveals the connection between the studs and base member.

FIGURES 10 and 11 show the details of the connector on the lower end of all of the studs 82 that lie intermediate the corner studs on the front wall, rear wall and side walls. The side edges of each of these studs are provided with longitudinal grooves 42 identical to the grooves in the top of the base frame elements. These grooves in the base frame elements and intermediate studs are aligned to receive the wall panels 22, 30 and 32 as shown in FIGURES 2, 3 and 4.

In FIGURES 10 and 11 it will be noted that a pin 84 is screwed into the lower end of each stud 82 preferably at an angle slightly inclined from the vertical. A similarly slanted hole 86 is drilled at appropriate locations in the base frame elements to receive these pins as shown in FIGURE 11. The slanted arrangement is preferable to lessen any tendency the studs might have to lift off the base frame elements although the pin and hole could, of course, be made vertical and function nearly as well.

All studs 82 except the corner studs 76, but including elements 38 and 88 that form parts of the door frame, are connected into the base frame elements in the manner just described. Door frame elements 38 and 88 have the portion thereof in front of the groove cut away up to the height of the door to form door stops 90 that can be seen in FIGURE 2. Otherwise, the jamb elements 38 and 88 are just like the studs 82. Although not shown in detail, the header 92 of the door frame has the same cross-section as the jambs and has a tongue at one end which fits into a groove in the jamb above the door and is secured at the other end in a suitable manner.

As shown in FIGURE 1, the two intermediate studs 82 on the front wall are interchangeable with one another and also with two like studs (not shown) on the rear wall.

The center stud 82x on the side walls is longer than the studs 82m and 82n on either side thereof and also includes a different connector on its upper end that will be described presently in connection with FIGURES 16 and 18-21, inclusive. Studs 82m and 82n differ from one another only in the oppositely inclined bias cuts provided on their upper ends. The right end wall, of course, would also have these same studs and those occupying corresponding positions are interchangeable.

The first of these studs to be erected after the base frame is in place are the center studs 82x that support the main ridge beam 94. FIGURES 16-21, inclusive, show the connection between these center studs and the main ridge beam which will now be described in connection therewith.

Studs 82x have their upper ends cut to provide edges 96 that slope downwardly in opposite directions from the center at the same angle as the pitch of the roof. In the center of this stud is a rather wide flat-bottomed and vertical sided notch 98 adapted to receive the projecting end 100 of the ridge beam 94 that is undercut to provide a shoulder 102 that abuts the inside face of the stud as shown most clearly in FIGURES 18 and 21. In addition, the bottom of notch 98 includes a narrower notch 104 adapted to receive the identical fastener assembly 54m that has been shown and previously described in connection with FIGURE 5. This fastener projects from the end of the main ridge beam and locks into keyhole slot 106 of face plate 108 that is screwed to the outside of the stud 82x such that said keyhole slot 106 and the notch 104 register with one another. The side margins of studs 82x are, of course, grooved as shown in FIGURE 21 to receive the panels 30.

Figure 26:
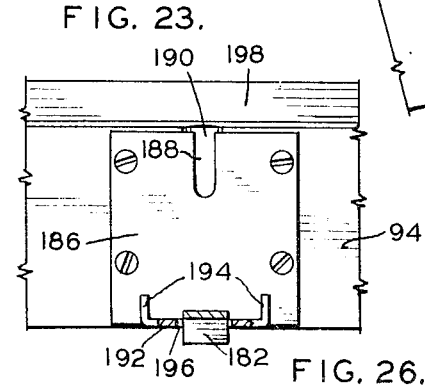
FIGURE 26 is a fragmentary front elevation showing the connector on the ridge beam that receives the intermediate rafters.
Figure 27:
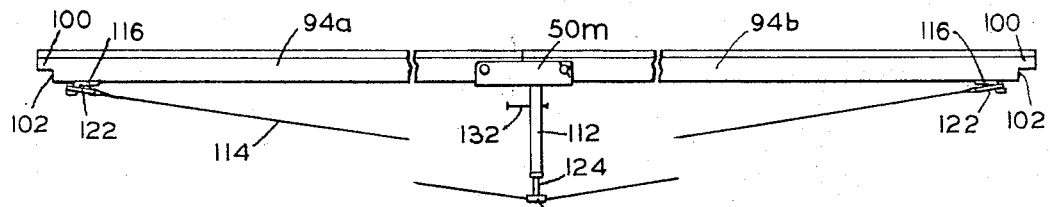
FIGURE 27 is a front elevation to a reduced scale showing the main ridge beam, portions thereof having been broken away to conserve space.
Figure 29:
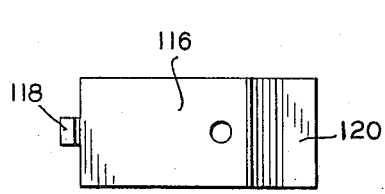
FIGURE 29 is a top plan view of the bracket to which the brace is fastened.
Figure 30:
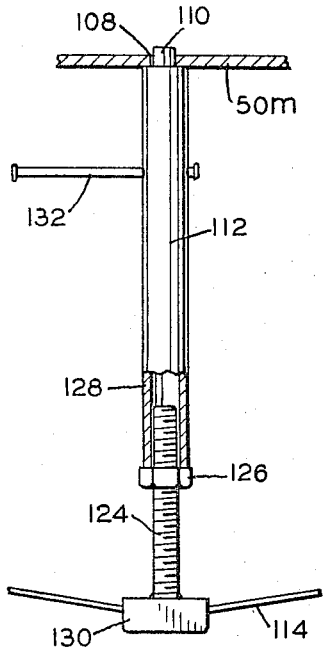
FIGURE 30 is a fragmentary front elevation of the adjustable center post for the brace, portions having been broken away and shown in section.
Figure 31:
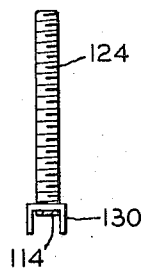
FIGURE 31 is a side elevation of the threaded stud of the adjustable center post; and, FIGURE 32 is a view along line 32—32 of FIGURE 12.

Having secured the ridge beam 94 to the center studs 82x, it becomes necessary to brace the long unsupported ridge beam span and join together the two sections thereof. In FIGURE 27 it will be seen that the sections 94a and 94b of the ridge beam are joined together by a connector 50m which, for all practical purposes, is identical to the connector 50 previously described in connection with FIGURES 7, 8 and 9. In the particular form shown, the only difference between connectors 50 and 50m is that the latter has a hole 108 (FIGURE 30) in the underside thereof that receives the pin 110 atop jack-screw assembly 112. It should, however, be explained that connector 50m can be further modified to include a similar type of rafter-support bracket to the one shown in FIGURES 25 and 26 when the dimensions of the structure are such that a rafter comes into the ridge beam at bracket 50m. As illustrated, however, the rafters fall on opposite sides of the connector 50m due to the odd number of panels in the front and rear walls.

Figure 28:
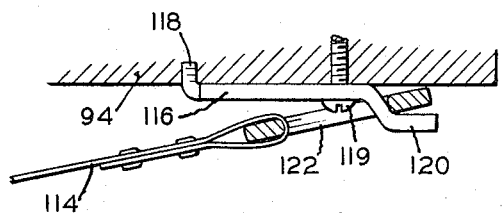
FIGURE 28 is an enlarged fragmentary section showing the connector for the brace at the ends of the main ridge beam.

The ridge beam brace assembly is shown in FIGURES 27-31, inclusive, and will be seen to include a jack-screw assembly 112, a tension member 114 and a pair of brackets 116 screwed into opposite ends of said beam. These brackets 116 comprise flat plates having an upturned pointed tongue 118 at their inner extremities that is driven into the underside of the wooden beam as shown in FIGURE 28 while the main portion of the bracket is secured thereto by a bolt 119. The outer end of the bracket has a downwardly offset portion 120 over which ring 122 fastened to the ends of the tension member hooks.

The jack-screw maintains the tension member under tension by means of a threaded rod 124 that screws into a nut 126 provided on the lower end of tube 128. The lower end of threaded rod 124 carries an inverted channel-shaped retainer 130 across which the tension member passes. Adjustment of the jack-screw is accomplished by rotating tube 128 relative to the threaded rod and a handle 132 is provided on the tube for this purpose to eliminate the need for a wrench or other tool.

Figure 22:
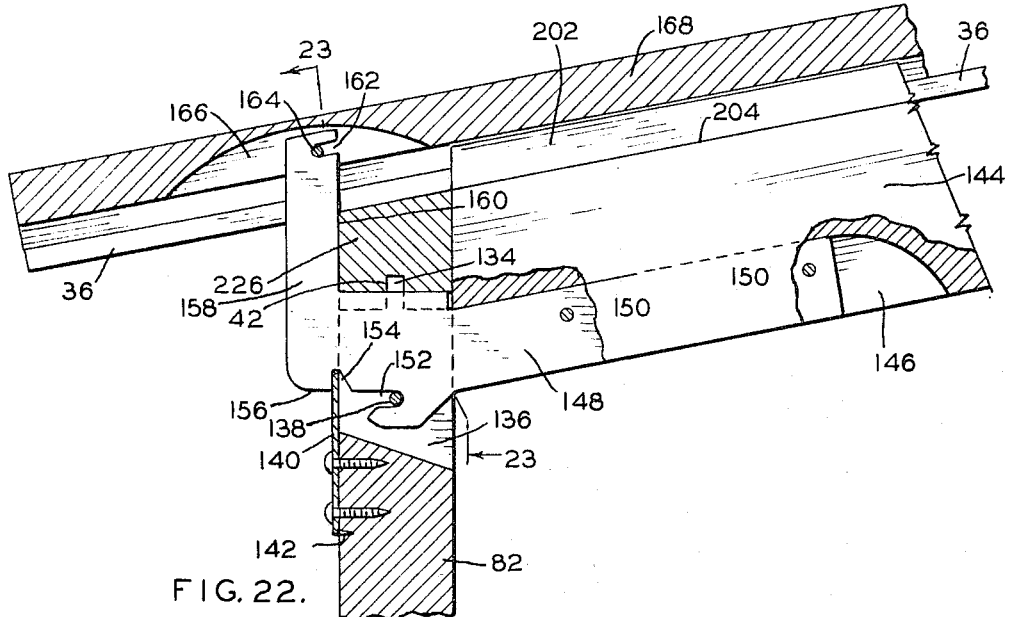
FIGURE 22 is a fragmentary vertical section showing the connection between the end rafters and corner studs.
Figures 23, 24:
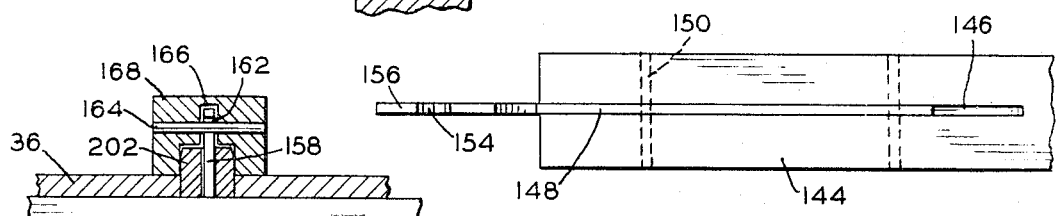
FIGURE 23 is a section taken along line 23—23 of FIGURE 22.
FIGURE 24 is a fragmentary bottom plan view to an enlarged scale of the end rafters.

As soon as the main ridge beam 94 is in place, an intermediate stud 82 on the front and rear walls together with its rafter must be added to produce a rigid frame. These details are shown in FIGURES 22-26, inclusive, to which reference will now be made. The studs 82 all have the panel-receiving grooves 42 on opposite side edges thereof, are square-cut across the top and have a transverse upwardly-projecting tongue 134 formed on the end thereof extending between said grooves 42. The end is also provided with a vertical slot 136 at approximately the mid point of the tongue 134 extending normal thereto. This slot is inclined downwardly and inwardly as shown in FIGURE 22 and is intersected near its bottom by a transverse pin 138 that extends horizontally between grooves 42. A small plate 140 having an inturned tab 142 on its lower edge that is driven into the face of the stud is screwed thereto so as to cover the lower portion of slot 136 as indicated in FIGURE 22.

The lower ends of the intermediate rafters 144 are slotted as at 146 on the underside to receive stud connector 148 that is fastened in place by transverse pins 150. This connector projects beyond the corresponding end of the rafter and includes a forwardly-opening notch 152 on the underside thereof located to engage pin 138 and a downwardly-facing notch 154 positioned slightly ahead and above notch 152 adapted to latch onto the top of plate 140 when pin 138 is in said forwardly-opening notch as seen in FIGURE 22. To connect the rafter, the inner end thereof that fastens to the ridge beam is dropped down to the point where notch 152 can be slipped over pin 138 by sliding same up inclined slot 136 thus allowing edge 156 to pass over the top of plate 140. Then, when the inner end of the rafter is raised up to the level of the ridge beam, the outer end will pivot about pin 138 and drop notch 154 into place over the upper edge of plate 140. This interlocks the rafter and stud.

Ahead of notch 154, connector 148 has an upstanding portion 158 whose inner edge 160 is substantially aligned with the front end of the stud 82. Near the upper end of this upstanding portion 158 is a rearwardly-opening notch 162 (FIGURE 22) in rear edge 160, the purpose of which is to receive pin 164 found in the slot 166 of rafter-cover element 168.

The upper end of the intermediate rafters 144 are bias cut to provide a vertical end 170 into which is inserted a screw 172 whose head 174 lies spaced therefrom a short distance. Below this screw is a horizontal notch 176 and a step 178 cut in the lower corner. An L-shaped connector 180 with the end 182 thereof turned down is inserted in the notch 176 and secured in place by nails 184 as shown in FIGURE 25.

Connector 182 and screw 172 connect into bracket 186 secured to the side of the main ridge beam 94. This bracket has an upwardly-opening notch 188 in the top edge thereof adapted to receive only the shank of screw 172 and lock the head 174 therebehind in groove 190 cut in the beam for this purpose. Bracket 186 also has an outturned lip 192 along its lower edge with upturned wings 194 on the side margins adapted to receive connector 180 whose downturned end 182 passes through slot 196 therein. Connector 180 and screw 172 thus cooperate with bracket 186 to fasten the rafters, to the ridge beam, as well as preventing the rafters from tilting relative thereto.

Figure 25:
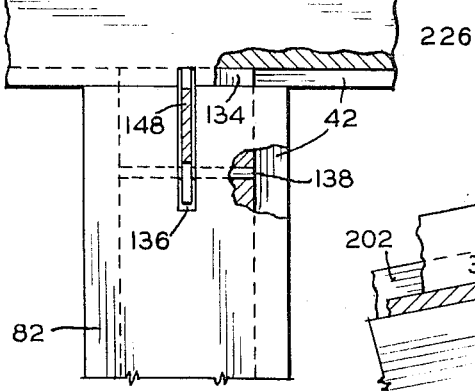
FIGURE 25 is a fragmentary vertical section showing the connection between the intermediate rafters and ridge beam.

As seen in FIGURE 25, the ridge beam has an upstanding rib 198 along the top thereof bordered on both sides by inclined ledges 200 that correspond to the slope of the roof and support the upper margins of the roof panels 36. The upper edges of the rafters have similar longitudinal ribs 202 bordered on both sides by ledges 204 that support the side margins of the roof panels. These ribs on the rafters and ridge beam project above the panels and are covered by cap members 168 and 206 that seal the joints and also lock the walls and roof in assembled relation. However, before these caps can be installed, the wall panels and roof panels must be in place.

Returning briefly to FIGURE 1, with one of the intermediate studs 82 in place along with its rafter 144, the wall panels 22 can be slipped into place on both sides thereof. Next, another wall stud and rafter assembly is erected before adding more wall panels. In general, all walls are erected from an intermediate stud 82 or center stud 82x outward toward the corners in both directions. As each panel is put in position, another stud or stud-rafter combination is added to the assembly. The door frame elements 38, 88 and 92; the narrow panels 26 and 208 bordering the door; and the door 24 utilize the same technique. End wall studs 82m and 82n are put in place along with the end panels 30 and 32 before the corner studs 76, stringers 226 and end rafters 216 are connected to the framework and before the roof panels or caps are added.

Once all the wall panels and intermediate studs and rafters are in place, the walls are completed by adding the corner studs 76 in the manner which will now be explained in connection with FIGURES 12, 13 and 14. The lower connection between the corner studs and the base has already been described in detail with reference to FIGURES 2-6.

The upper end of stud 76 is step-cut on the bias as shown in FIGURE 12 at 210 to leave a shoulder 212 against which the notch 214 in the end of rafter 216 fits. A rearwardly-opening longitudinal groove 42 is provided in the rear edge of the stud 76 to receive end panels 32 and a similar groove is provided in the inside face to receive narrow front wall panel 26 that borders the door or full width panels 22 on the right side of the front wall, right side of the rear wall and left side of the rear wall. A slot 218 is provided in the bottom of the edge groove 42 into which is fastened connector 158m that projects upwardly along shoulder 212 and has a rearwardly-opening notch 162 in its upper extremity. The lower end of rafter 216 is slotted at 220 to receive the notched end of connector 158m as shown in FIGURE 12. The rafter is held in place in top of stud 76 by cap 168m that has slot 166 therein intersected by pin 164 providing a connection much like that previously described while referring to FIGURES 22, 23 and 24. Connector 158m differs structurally from connector 158 in that it is a separate element and is no part of bracket 148. Functionally, however, they are identical. The difference in the caps 168 and 168m lies in their slightly modified cross-section, however, here again, they are functionally the same. Rafter 216, on the other hand, is substantially different structurally from intermediate rafter 144.

Rafter 216 has an upstanding rib 202m but only one ledge 204m on the outside edge thereof where rafter 216 passes over stud 76. The ledge 205m, FIGURE 32, on the inside edge of rafter 216 has been deleted where the latter passes over stud 76 as it is unnecessary at this point for rafter 216 to support the roof panels 36, since the latter are being supported on the top edge of the stringer 226 as best seen in FIGURE 14. Deletion of the ledge 205m immediately above stud 76 permits stringer 226 to be received on top of stud 76.

Stud 76 is also provided with a transversely extending vertical slot 222 that parallels shoulder 212 and is intersected by pin 224 near the base thereof. A stringer 226 having a downwardly-opening longitudinal groove 42 in the underside thereof is placed along the top of the front and rear walls, said groove receiving the panel edges and the ribs 134 on the upper ends of the intermediate studs. The connection with the corner studs is made by means of L-shaped connector 228 which is fastened in slot 230 in the ends of stringer 226 by pins 232. Connector 228 has a downwardly opening notch 234 in the projecting downturned end 236 thereof that latches over pin 224 of the corner stud as shown in FIGURE 14. The roof panels 36 rest upon the stringers, the upper surface 238 of which slope upwardly to conform with the pitch of the roof.

Returning again briefly to FIGURES 16 and 18, the connection between the end rafters 216 and the main ridge beam 94 will be described. A headed screw 240 is screwed into the end of the ridge beam above plate 108 leaving a space underneath the head adapted to receive connectors 242 fastened by screws 244 to the outside face of the end rafters. Each of these connector plates has an upwardly-opening notch 246 in the projecting end thereof sized to receive the shank of screw 240 and latch therebehind. The connection is made by raising the eave end of the rafter well above horizontal until the notch 246 will fit over the screw shank and then dropping the rafter back down until it rests on the inclined edges of the end walls. As the rafter is dropped down, connector 158m of the corner stud 76 will pass up through slot 220 in position to receive the cap 168m.

The next step is the addition of the roof panels 36 and this operation can best be described in connection with FIGURES 15, 22 and 25 to which reference will now be made. Each upstanding connector piece 158 that forms a part of element 148 is positioned to pass between the edges of adjacent panels 36. Openings 250 are provided at selected points along the roof panels in position to receive brackets 252 fastened to the stringers. These brackets shown in FIGURE 15 have an inturned pointed projection 254 along their lower edge that is driven into the wood and a screw fastener 256 providing additional holding power. The upper portion of the bracket is bent once to provide a leg 258 extending upwardly along the roof in spaced relation above the inclined upper face 238 of the stringer. The size of opening 250 is sufficient to pass leg 258 in its entirety.

The roof panels are laid on top of rib 198 of the main ridge beam 94 and the legs 258 of bracket 252 along with the upstanding portion 158 of bracket 148 passed up through the registering openings in the panel. Next, the panels are moved down slightly until the upper edge thereof drops into place below rib 198 of the main ridge beam (FIGURE 25). In this position, the leg 258 of the bracket will overlie the roof panel as shown in FIGURE 15 and hold the lower edge thereof in place. The upper edges of the roof panels remain free to raise up, however, and main ridge beam cap 206 must be added to hold them down. Before this happens the rafter caps 168 and 168m must be added. These caps are also laid atop the rib 198 of the main ridge beam and moved down slightly until the pins 164 lock into the slots 162 of the connectors 158 and 158m. Caps 168, 168m and 206, of course, cover the joints in the roof and effectively seal same.

The final step in the assembly is the addition of main ridge beam cap 206 that can best be described in connection with FIGURES 16, 17 and 18. At the ends of the main ridge beam caps 206, T-shaped plates 260 are screwed in place with the cross bar portion 262 of the "T" provided with downturned edges 264 that form downwardly opening channels adapted to receive and retain the rafter cap 168m as shown in FIGURE 16. A similar plate 260m is fastened to the ridge cap intermediate the ends in position to retain the intermediate rafter caps (FIGURE 25).

At intervals along the main ridge beam 206, upstanding pins 266 are screwed in place and provided with an annular groove 268. Plate 260 and cap 206 have openings 270 therein adapted to pass pin 266. Mounted atop plate 260 is a second slide plate 272 held in place by screw 274 that passes through elongate slot 276. The end of this second plate is notched at 278 so as to receive the annular groove 268 of pin 266 locking the cap 206 to the main ridge beam. Thus, after the ridge beam cap is in place and locked to the beam 94, the entire assembly is locked together.

Having thus described the several useful and novel features of the pre-fabricated building structure of the present invention, it will be apparent that the many worthwhile objectives for which it was developed have been achieved. Although but a single specific embodiment of the invention has been illustrated and described herein, I realize that certain changes and modifications therein may well occur to those skilled in the art within the broad teaching hereof; hence, it is my intention that the scope of protection provided hereby shall be limited only insofar as said limitations are expressly set forth in the appended claims.

What is claimed is:

1. The pre-fabricated dwelling unit which comprises: a rectangular base frame including front and rear wall-supporting elements interconnected at their ends by sidewall supporting members to form corners, said wall-supporting members each having an upwardly-opening longitudnal groove in the top surface thereof adapted to receive and retain a wall panel; first connector means releasably interconnecting the frame elements at the corners formed thereby; upright stud-forming elements having longitudinal grooves in the surfaces thereof facing along a wall, said stud-forming elements including a stud at each corner and at least one intermediate stud located between the corner studs on each wall, one of said intermediate studs comprising a center stud positioned midway between the corner studs on both end walls, the corner and intermediate studs on the front and rear walls being of uniform length, the intermediate studs on the end walls being longer than the corner studs and adapted to define a gabled roof line with uniform pitch sloping downwardly toward the eaves from the ridge thereof defined by the center studs, and two of said studs including at least one intermediate stud cooperating to define jamb elements of a door frame; second connector means releasably fastening the intermediate studs to the base frame elements in fixed spaced parallel relation to one another; third connector means carried on the lower ends of the corner studs releasably fastening the latter to the first connector means of the base frame; a main ridge beam spanning the space between the center studs of the end walls; rafters including end rafters connecting each corner stud and at least one intermediate rafter connected to one of the intermediate studs on both the front and rear walls, and each of said rafters having each side thereof facing along the roof shaped to provide a ledge adapted to support a roof panel; fifth connector means releasably interconnecting the intermediate rafters to the main ridge beam; sixth connector means releasably interconnecting the intermediate rafters to one of the intermediate studs; seventh connector means releasably interconnecting the end rafters to the main ridge beam; eighth connector means releasably interconnecting the end rafters to one of the corner studs; a plurality of wall panels inserted into the grooves in the studs and base frame elements to form a rectangular enclosure; a door hingedly attached to one of the jamb-forming studs; front and rear stringer elements having grooves in the underside thereof receiving the upper edges of the front and rear wall panels; ninth connector means releasably interconnecting the ends of the stringers to the corner studs; a plurality of roof panels covering the openings defined between the rafters and extending from the main ridge beam to the stringers, said panels resting upon the stringers and projecting therebeyond to form overhanging eaves, and the side edges of said roof panels resting upon the rafter ledges so as to leave a portion of said rafters accessible therebetween; tenth connector means releasably fastening the roof panels to the stringers; rafter cap members overlying each rafter and resting upon the roof panels so as to seal the joints therebetween; eleventh connector means carried by the intermediate rafter caps releasably fastening same to the sixth connector means; twelfth connector means carried by the end rafter caps releasably fastening same to the seventh connector means; a main ridge beam cap element overlying the main ridge beam and resting upon the roof panels so as to seal the joints therebetween; thirteenth connector means releasably interconnecting the main ridge beam cap element to the main ridge beam; and, fourteenth connector means carried by the main ridge beam cap in position to overlie the uppermost ends of the rafter caps and hold the latter down upon the roof panels.

2. The pre-fabricated dwelling unit as set forth in claim 1 in which: the first connector means comprises a threaded pin projecting from the end of one of the corner-forming base frame elements, a horizontal slot adapted to receive the pin on the other of said corner-forming members, and a permanently-attached nut-type fastener threaded onto the pin.

3. The pre-fabricated dwelling unit as set forth in claim 1 in which: the second connector means comprises a pin projecting from one of said intermediate stud and base frame members and a hole in the other of said members adapted to receive the pin.

4. The pre-fabricated dwelling unit as set forth in claim 1 in which: the fourth connector means comprises a threaded pin projecting from each end of the main ridge beam, an upwardly-opening slot in the upper end of each center stud adapted to receive the pin, a plate having an upwardly-opening key-hole-shaped slot therein fastened to the face of the stud with the slots in registry with one another, and a nut-type fastener threaded onto the pin, said fastener having an annular shoulder on the inside thereof adapted to enter the circular portion of the keyhole-shaped slot and lock the pin therein.

5. The pe-fabricated dwelling unit as set forth in claim 1 in which: the fifth connector means comprises a generally L-shaped bracket having a vertical portion fastened to the rafter-engaging face of the main ridge beam and a horizontal portion projecting outwardly from the lower margin of the vertical portion to form a ledge, said horizontal portion having an aperture therein; and, a horizontal plate fastened to the upper end of the rafter, said plate having a downturned end adapted to enter the aperture in the horizontal portion of the L-shaped bracket secured to the main ridge beam.

6. The pre-fabricated dwelling unit as set forth in claim 1 in which: the sixth connector means comprises aligned slots in the adjoining ends of the stud and rafter, a pin intersecting one of said slots and a notched plate fastened in the other of said slots projecting into the first-mentioned slot containing the pin, the notch in said plate opening in a direction to receive the pin upon relative movement of the stud and rafter into assembled relation.

7. The pre-fabricated dwelling unit as set forth in claim 1 in which: the upper end of the center studs is provided with oppositely-inclined ledges on both sides of the main ridge beam adapted to support the adjacent extremities of the end rafters; and, the seventh connector means comprises a headed-fastener projecting from the end of the main ridge beam between the supported extremities of the end rafters, said head lying in spaced relation to the ridge beam end from which the fastener projects, and a plate fastened to the exposed side of each end rafter projecting beyond the upper extremity thereof, the projecting portion of said plate containing an upwardly-opening notch positioned and adapted to lock undereneath the fastener behind the head thereof when said rafters, ridge beam and center stud occupy an assembled relation to one another.

8. The pre-fabricated dwelling unit as set forth in claim 1 in which; the eighth connector means comprises a vertical slot in the end wall-facing edge of the corner stud, a registering slot in the lower end of the end rafter, and a plate fastened within the slot in the stud projecting upwardly therebyeond into the slot in the rafter.

9. The pre-fabricated dwelling unit as set forth in claim 1 in which the ninth connector means comprises aligned slots in the adjoining ends of the corner studs and stringer, a pin intersecting one of said slots and a notched plate fastened into the other of said slots projecting into the first-mentioned slot containing the pin, the notch in said plate opening downwardly in position to move over the pin upon relative movement of said corner stud and stringer into assembled relation.

10. The pre-fabricated dwelling unit as set forth in claim 1 in which. the tenth connector means comprises inverted generally L-shaped brackets having a vertical portion fastened to the exposed face of the stringer and the remaining portion projecting inwardly and upwardly in spaced relation above the top surface of the stringer, and an elongated opening in the portion of the roof panel overlying the stringer adapted to pass the upwardly and inwardly inclined leg of the bracket in its entirety, said leg being adapted to overlie the roof panel above the opening therein upon movement of said panel away from the ridge beam.

11. The pre-fabricated dwelling unit as set forth in claim 1 in which: the thirteenth connector means comprises upstanding pins having annular grooves encircling same projecting upwardly from the main ridge beam at longitudinally-spaced points, apertures in the main ridge beam cap positioned to pass the pins projecting from the main ridge beam, and a plate having a slotted edge mounted on the main ridge beam cap for slidable movement from an unlocked position into a locked position wherein said slot passes onto the annular groove in the pin and holds said main ridge beam and cap therefor in assembled relation.

12. The pre-fabricated dwelling unit as set forth in claim 1 in which: the fourteenth connector means comprises a plate fastened to the top of the main ridge beam cap with portions projecting laterally therefrom into position overlying the adjacent ends of the rafters, said laterally-extending portions including downturned side margins cooperating to define a channel adapted to receive the rafter ends and prevent both vertical and sidewise movement thereof.

13. The pre-fabricated dwelling unit as set forth in claim 1 in which: the front and rear base frame elements and the main ridge beam comprise two parts fastened together in end-to-end abutting relation; and, fifteenth connector means releasably interconnect said elements together to form a unitary structure, said fifteenth connector means comprising an upwardly-opening channel sized and adapted to receive the ends of said two-part elements in abutting relation with the joint therebetween intermediate the ends of the channel, means permanently fastening one end of the channel to the elements positioned in said end, said other end of said channel having a horizontally-disposed keyhole-shaped slot therein, a fastener having a threaded shank fastened into the other of said elements in position to pass into the keyhole-shaped slot in the channel through the narrow part thereof, and a nut-type fastener having an annular shoulder on the inside thereof sized to lock into the circular portion of the keyhole-shaped slot threaded onto the fastener.

14. The pre-fabricated dwelling unit as set forth in claim 2 in which the third connector means comprises a plate fastened to side of the corner stud projecting downwardly therefrom across the horizontal slot in the corner-forming member, said plate having a vertical slot therein positioned to receive the pin projecting from the other of said corner-forming members, the nut-type fastener being adapted to bear against the plate and hold the corner stud and corner-forming elements of the base frame in assembled relation.

15. The pre-fabricated dwelling unit as set forth in claim 6 in which: the pin is located in the slot in the stud, the notched plate is fastened in the slot in the rafter, a plate is fastened to the exterior of the stud in position to cover the lower end of the slot in the stud, and a second downwardly-opening notch is provided in the plate positioned and adapted to hook over the edge of the plate when the first-mentioned slot receives the pin.

16. The pre-fabricated dwelling unit as set forth in claim 6 in which: the pin is located within the slot in the stud, the plate is fastened within the slot in the rafter, said plate includes an upstanding portion at the outer extremity thereof adapted to pass upwardly along the outside of the stringer, said upstanding portion including a notch in the upper end thereof opening toward the ridge beam; said rafter having an aperture therein adapted to pass the notched upstanding portion of the plate; and, the eleventh connector means comprises a slot in the underside of the rafter cap positioned and adapted to receive said notched upstanding portion of the plate of the sixth connector means and a pin intersecting the slot in the rafter cap adapted to enter the notch in said upstanding portion of the plate upon movement of said cap away from the main ridge beam.

17. The pre-fabricated dwelling unit as set forth in claim 8 in which: the plate fastened within the slot in the stud projects upwardly above the slot in the rafter, said projecting end having a notch therein opening toward the ridge beam; and said twelfth connector means comprises a slot in the underside of the rafter cap positioned to receive said notched end of the plate of the eighth connector means, and a pin intersecting the slot in the underside of the rafter cap, said pin being positioned and adapted to enter the notch in the projecting end of said plate upon movement of said rafter cap away from the main ridge beam.

18. The pre-fabricated dwelling unit as set forth in claim 11 in which: the plate has a second slot intermediate the ends thereof longitudinally aligned with the first-mentioned slot in the edge, and a headed fastener passes through said second slot securing the plate to the main ridge beam cap for slidable movement between unlocked and latched positions.

19. The pre-fabricated dwelling unit as set forth in claim 14 in which: the slot in the plate is keyhole-shaped and the fastener has an annular shoulder on the inside thereof adapted to enter the circular enlargement of the keyhole-shaped slot in the plate so as to prevent the corner stud from lifting free of the corner-forming base frame element.

References Cited by the Examiner

UNITED STATES PATENTS

| | | | |
|---|---|---|---|
| 1,506,267 | 8/1924 | Swisher | 52—270 |
| 2,293,569 | 8/1942 | Sonino | 52—90 |

FOREIGN PATENTS

| | | |
|---|---|---|
| 875,507 | 1942 | France. |
| 1,340,186 | 1963 | France. |
| 784 | 1852 | Great Britain. |
| 736,021 | 1955 | Great Britain. |

FRANK L. ABBOTT, *Primary Examiner.*

R. A. STENZEL, *Assistant Examiner.*